No. 801,095. PATENTED OCT. 3, 1905.
W. T. LEWIS.
GUARD FOR HORSES.
APPLICATION FILED MAY 12, 1905.

Inventor
Washington T. Lewis,
By
Mason, Fenwick & Lawrence
Attorneys.

Witness
Severance
J. M. Fowler Jr.

UNITED STATES PATENT OFFICE.

WASHINGTON T. LEWIS, OF DENVER, COLORADO.

GUARD FOR HORSES.

No. 801,095.          Specification of Letters Patent.          Patented Oct. 3, 1905.

Application filed May 12, 1905. Serial No. 260,145.

*To all whom it may concern:*

Be it known that I, WASHINGTON T. LEWIS, a citizen of the United States, residing at Denver, in the county of Denver and State of Colorado, have invented certain new and useful Improvements in Guards for Horses; and I do hereby declare the following to be a full, clear, and exact description of the invention, such as will enable others skilled in the art to which it appertains to make and use the same.

This invention relates to improvements in guards or shields for horses; and it is designed for application to valuable animals to prevent them from injury by self-abuse.

The invention comprises certain novel constructions, combinations, and arrangements of parts, as will be hereinafter fully described and claimed.

Figure 1:
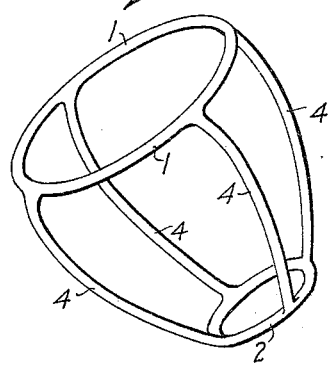
Figure 2:
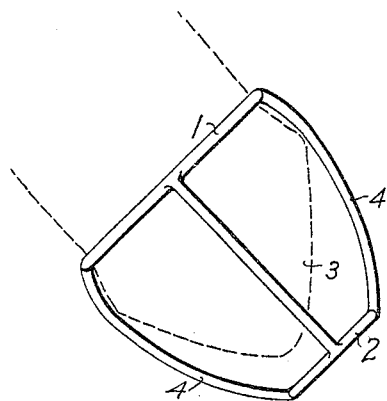

In the accompanying drawings, Figure 1 is a perspective view of my improved guard or shield. Fig. 2 is a side elevation of the same, dotted lines being shown to indicate the manner of its application.

The device forming the subject-matter of the present invention is so constructed that it may be applied to a horse or stallion and left in applied position without inconvenience or injury to the animal. It is constructed with a securing or attaching ring 1, preferably formed of silver or other non-corroding material, and extending therefrom are a series of bars 4, made comparatively thin and of any suitable material. I have shown four of such bars in the drawings; but of course it will be evident that I may use a less or a greater number of the same, as found most desirable, without departing from the spirit of the invention. The bars curve laterally from the ring 1 and are drawn together sufficiently to be secured to an outer smaller ring 2. The bars 4 are thus securely held at each end and will not be separated or spread apart by the expansion of the organ upon which the device is applied.

In use the device is applied to the penis 3, as indicated in dotted lines in Fig. 2, the ring 1 being of such a size that it can just be slipped over the head of the penis and will be retained thereon because of its own size. In the normal condition of the organ the bars 4 will not be an inconvenience to the animal; but in the event of an attempted erection of the part the expansion of the head of the penis 3 will cause the same to be forced against the bars 4, the said bars cutting into the same and causing sufficient pain to produce a cessation of the erection. It will thus be seen that the device is not disagreeable or hurtful to the animal when the organ is in its normal non-erectile condition, and it may be carried by the animal at all times without inconvenience. It will of course thus be always in readiness for a suppression of erection and will act as a preventative of self-abuse in the animal and save injury to him.

The device is exceedingly simple in structure and yet quite effective for the desired purpose. It will be noted that the ring 1 fits so snugly in position that it will not be accidentally pulled from place. Of course it can be easily removed when it is the purpose of the owners of the animal to have the same taken off.

Having thus described my invention, what I claim, and desire to secure by Letters Patent, is—

1. A guard for horses, comprising a securing-ring and arms projecting therefrom, and capable of cutting or pressing into the organ of an animal for preventing an erection.

2. A shield for horses, comprising an attaching-ring, a series of arms curved outwardly and laterally with respect thereto, and a bracing-ring connected with their outer ends.

3. A shield for horses, comprising a snugly-fitting attaching-ring, curved, pain-producing arms extending therefrom, and means for connecting or joining the said outer ends.

4. A guard comprising an organ-receiving closure, made up of rings spaced apart, and pain-inflicting bars or rods connecting the said rings, one of said rings forming an attaching means for securing the guard in place.

In testimony whereof I have affixed my signature in presence of two witnesses.

WASHINGTON T. LEWIS.

Witnesses:
W. B. SHATTUC,
CHESTER E. SMEDLEY.